(12) United States Patent
Chao

(10) Patent No.: US 11,814,131 B2
(45) Date of Patent: Nov. 14, 2023

(54) SYNCHRONOUSLY DRIVEN BRAKE

(71) Applicant: ROYALBABY CYCLE BEIJING CO., LTD., Beijing (CN)

(72) Inventor: Zhiwei Chao, Beijing (CN)

(73) Assignee: ROYALBABY CYCLE BEIJING CO., LTD., Beijing (CN)

( * ) Notice: Subject to any disclaimer, the term of this patent is extended or adjusted under 35 U.S.C. 154(b) by 0 days.

(21) Appl. No.: 18/071,702

(22) Filed: Nov. 30, 2022

(65) Prior Publication Data
US 2023/0166808 A1    Jun. 1, 2023

(30) Foreign Application Priority Data
Nov. 30, 2021 (CN) .......................... 202111448236.8

(51) Int. Cl.
*B62L 1/14* (2006.01)
(52) U.S. Cl.
CPC ..................................... *B62L 1/14* (2013.01)
(58) Field of Classification Search
CPC .... B62L 1/14; F16D 2127/10; F16D 2125/66; F16D 2125/60
USPC ........................................... 188/24.11–24.22
See application file for complete search history.

(56) References Cited

U.S. PATENT DOCUMENTS

| 5,299,664 | A | * | 4/1994 | Peters | ....................... | B62L 1/16 |
| | | | | | | 188/24.15 |
| 5,564,531 | A | * | 10/1996 | Lumpkin | ................ | B62L 1/005 |
| | | | | | | 188/24.12 |
| 5,775,466 | A | * | 7/1998 | Banyas | ...................... | B62L 1/14 |
| | | | | | | 188/24.21 |
| 7,353,918 | B1 | | 4/2008 | McIntyre | | |

FOREIGN PATENT DOCUMENTS

CN         113978597 A      1/2022

OTHER PUBLICATIONS

First Office Action cited in corresponding patent application CN202111448236.8, dated Jun. 17, 2022, 4 pages.

* cited by examiner

*Primary Examiner* — Xuan Lan Nguyen
(74) *Attorney, Agent, or Firm* — COOPER LEGAL GROUP, LLC

(57) ABSTRACT

The present application relates to a synchronously driven brake, belonging to the field of vehicle brake devices. The synchronously driven brake includes a balancing frame configured to be connected with a brake cable and driven by the brake cable, wherein a pull cable is connected to the balancing frame and connected with two cable locking members, and configured to apply a same force to the two cable locking members; braking portions driven by the cable locking member to move and press against a wheel rim to decelerate the wheel rim are respectively connected to the cable locking members; and the synchronously driven brake further includes restoring portions applying to the braking portions a force enabling the braking portions to move away from the wheel rim.

14 Claims, 5 Drawing Sheets

SYNCHRONOUSLY DRIVEN BRAKE

CROSS-REFERENCE TO RELATED APPLICATION

The present application claims a priority of Chinese application No. 202111448236.8, filed on Nov. 30, 2021. The entirety of China application No. 202111448236.8 is hereby incorporated by reference herein and made a part of this specification.

TECHNICAL FIELD

The present application relates to the field of vehicle braking devices, and, in particular, to a synchronously driven brake.

BACKGROUND ART

In a currently known brake for children bicycles, an actuating brake generally adopts a form of a caliper brake, a disc brake, and a V brake, in which a brake cable is pulled via a brake handle to directly pull a bracket to act on braking blocks, and the braking blocks clamp a wheel rim or a disc to decelerate the bicycle. A holding force depends entirely on the child's grip strength. However, even if the child can operate the braking blocks to perform clamping with a small grip strength, a long time of vigorous operation is required for the braking blocks to generate a friction with the wheel rim relying on a clamping force provided by the child's grip strength if the riding speed is fast, which prolongs a braking distance.

At present, there are oil disc brakes, disc brakes and other brakes that require a relatively light grip strength on the market. However, they often suffer from two problems: one is high cost; and the other is high requirements for formation of a brake handle, since it will be difficult for small hands of a children to operate such brake handles conveniently, leading to inconvenient braking operation.

In view of the above related technologies, it is believed that there is a room for improving a conventional brake device used in a children bicycle.

SUMMARY

In order to evenly transmit an actuating force of a brake cable to a braking block, the present application provides a synchronously driven brake, which can, for example, address a defect that an existing brake cable directly drives two braking blocks to move and contact a same wheel rim.

A synchronously driven brake provided by the present application adopts the following technical solutions.

A synchronously driven brake includes a balancing frame configured to be connected with a brake cable and driven by the brake cable, wherein a pull cable is connected to the balancing frame and connected with two cable locking members, and configured to apply a same force to the two cable locking members; braking portions driven by the cable locking member to move and press against a wheel rim to decelerate the wheel rim are respectively connected to the cable locking members; and the synchronously driven brake further includes restoring portions applying to the braking portions a force enabling the braking portions to move away from the wheel rim, wherein the restoring portions are in one-to-one correspondence to the two braking portions, and the restoring portions keep the pull cable and the balancing frame connected with the brake cable in a tensioned state.

In the above technical solution, when a rider exerts an acting force on the brake cable, the brake cable drives the balancing frame to move and drive the two cable locking members connected to the balancing frame through the pull cable to move synchronously. The two cable locking members are subjected to the same acting force, and the pull cable has the acting same force on the braking portions. Therefore, the two braking portions have the same acting force on both sides of the wheel rim to ensure a synchronous braking of the braking portions on both sides of the wheel rim, and avoid different acting forces of the two braking portions on the wheel rim when there is a local deformation at the periphery of the wheel rim, which, on one hand, cause an uneven wear after long-term use of the wheel room, and on the other hand, cause an unbalanced fraction force on the wheel rim during the braking process. The restoring portions can apply acting forces to the cable locking members after the acting force on the brake cable is removed, so that the braking portions are move to be separated from the wheel rim, while keeping the balancing frame and the pull cable in a tensioned state. When the acting forces of the balancing frame on the two pull cables are different, the restoring portions drive the balancing frame to move, so that the acting forces of the balancing frame on the pull cables are rebalanced.

In some embodiments, the restoring portion includes a cable holder fixedly connected to a bicycle body, and a restoring spring located between the cable holder and the cable locking member to apply a force in a direction away from the balancing frame.

In the above technical solution, when the pull cables exert the acting forces on the cable locking members, the pull cables drive the cable locking members to move to reduce a distance between the cable locking members and the balancing frame, and the acting forces of the restoring spring on the cable holder the cable locking members are further increased. The restoring spring drives the cable locking members to move in response to the acting force of the brake cable on the balancing frame being removed, thereby increasing a gap between the cable locking member and the balancing frame. The cable locking members drive the braking portions to move, such that the braking portions are separated from the wheel rim.

In some embodiments, the restoring spring is a pressure spring sleeved outside of the pull cable.

In the above technical solution, when the cable locking members exert the acting forces on the braking portions, a distance between the cable locking member and the cable holder is reduced, so that the pressure spring is further compressed to increase the acting forces of the pressure spring on the cable locking members. Meanwhile, the pressure spring sleeved outside the pull cable can maintain radial stability during deformation.

In some embodiments, the restoring portion includes a connecting shaft fixedly connected to the bicycle body and a torsion spring sleeved outside the connecting shaft, one end of the torsion spring is connected to a rotating part, and the other end of the torsion spring is fixedly connected to the bicycle body.

In the above technical solution, when the pull cable drives the cable locking members to move, the cable locking members is rotated to directly drive one end of the torsion spring to make a further torsion, thereby generating a larger moment. After the acting force of the brake cable on the balancing frame is removed, the torsion spring drives the cable locking members to move, so that a gap between the cable locking member and the balancing frame is increased and the cable locking members drive the braking portions to move away from the wheel rim.

In some embodiments, one pull cable is provided, the balancing frame is slidably connected with the pull cable, and two ends of the pull cable are connected with the two cable locking members respectively.

In the above technical solution, when the brake cable drives the balancing frame to move, the balancing frame drives the pull cable to move, so as to achieve a same force on two locking parts by using only one pull cable.

In some embodiments, two pull cables are provided. The balancing frame is rotatably connected to the bicycle body; a rotation axis of the balancing frame is located between positions of the balancing frame that are connected with the two pull cables; one pull cable is fixedly connected with the balancing frame, and the other pull cable is fixedly connected with the brake cable and slidably connected with the balancing frame; and a sleeve sleeved outside the brake cable is fixedly connected to the balancing frame.

In the above technical solution, when the brake cable drives one of the pull cables to slide, a gap between the sleeve and the cable locking member is decreased, the sleeve exerts a pressure on the balancing frame, and the balancing frame is rotates around its rotation axis, and pulls the other pull cable to move. Since the brake cable is fixed to the pull cables, an acting force of the sleeve on the balancing frame is equal to the acting force of the pull cable on the cable locking member, so that the acting forces of the two pull cables on the cable locking members remain the same.

In some embodiments, a guide base that is provided outside the braking portion and configured to guide each braking portion to slide in a linear direction.

In the above technical solution, the guide base can guide the braking portions to slide along a fixed trajectory.

In some embodiments, a sliding direction of the braking portion is oblique to an axial direction of the wheel rim; and the braking portion is moved toward a forward direction of the wheel rim when the bicycle body is moved forward.

In the technical solution, when each of the braking portions is in contact with the side surface of the wheel rim, the rotating wheel rim will drive the braking portion to continue to move close to the wheel rim, and the braking portion is limited by the guide base and wheel rim, and is inserted between the guide base and the wheel rim like a wedge. Compared with an existing method in which the wheel rim is braked by means of clamping through a frictional resistance produced by the pressure, this solution can drive the braking portions to move to press against the wheel rim merely by exerting a relatively small acting force on a driving mechanism. The acting force generated by the rotation of the wheel rim itself drives the braking portions to press against the wheel rim to realize the braking of the synchronously driven brake and reduce the acting force exerted on the driving mechanism for braking.

In some embodiments, a pull rod fixedly connected to the guide base is fixedly connected to the cable locking member; a wheel gear is fixedly provided on the pull rod; and a rack that keeps meshed with the wheel gear when the braking portion moves is fixedly provided on the braking portion.

In the above technical solution, the cable locking members are rotated to drive the pull rod to rotate, the pull rod drives the wheel gear to rotate, and the wheel gear drives the rack to move, thereby driving the braking portions.

In summary, the present application can achieve at least one of the following beneficial technical effects.

1. A rider exerts an acting force on the brake cable, the brake cable drives the balancing frame to move, and the balancing frame moves to at the same time drive the two cable locking members connected to the balancing frame through the pull cable to move synchronously. The two cable locking members are subjected to the same acting force, and the pull cable has the acting same force on the braking portions. Therefore, the two braking portions have the same acting force on both sides of the wheel rim to ensure the braking synchronization of the braking portions on both sides of the wheel rim, and avoid different acting forces of the two braking portions on the wheel rim when the local position in the circumferential direction of the wheel rim is deformed, which, on one hand, cause an uneven wear after long-term use of the wheel room, and on the other hand, cause an unbalanced fraction force on the wheel rim during the braking process. The restoring portions can apply acting forces to the cable locking members after the acting force on the brake cable is removed, so that the braking portions move and are separated from a coil; and also keep the balancing frame and the pull cable in a tensioned state. When the acting forces of the balancing frame on the two pull cables are different, the restoring portions drive the balancing frame to move, so that the acting forces of the balancing frame on the pull cables are balanced.

2. After the pull cables exert the acting forces on the cable locking members, the pull cables drive the cable locking members to move to reduce a distance between the cable locking members and the balancing frame, and the acting forces of the restoring spring on the cable holder and the cable locking members are further increased. The restoring spring drives the cable locking members to move in response to the acting force of the brake cable on the balancing frame being removed, thereby increasing a gap between the cable locking member and the balancing frame. The cable locking members drive the braking portions to move, such that the braking portions are separated from the wheel rim.

3. When each braking portion is in contact with the side surface of the wheel rim, the rotating wheel rim will drive the braking portions to continue to move close to the wheel rim, and the braking portions are limited by the guide base and the wheel rim, and are inserted between the guide base and the wheel rim like a wedge. Compared with the existing method in which the wheel rim is braked by means of clamping through a frictional resistance produced by the pressure, this scheme can drive the braking portions to move to be press against the wheel rim just by exerting a relatively small acting force on the driving mechanism. The acting force generated by the rotation of the wheel rim itself drives the braking portions to be pressed against the wheel rim to realize the braking of the synchronously driven brake and reduce the acting force exerted on the driving mechanism when braking.

DETAILED DESCRIPTION

Figure 1:
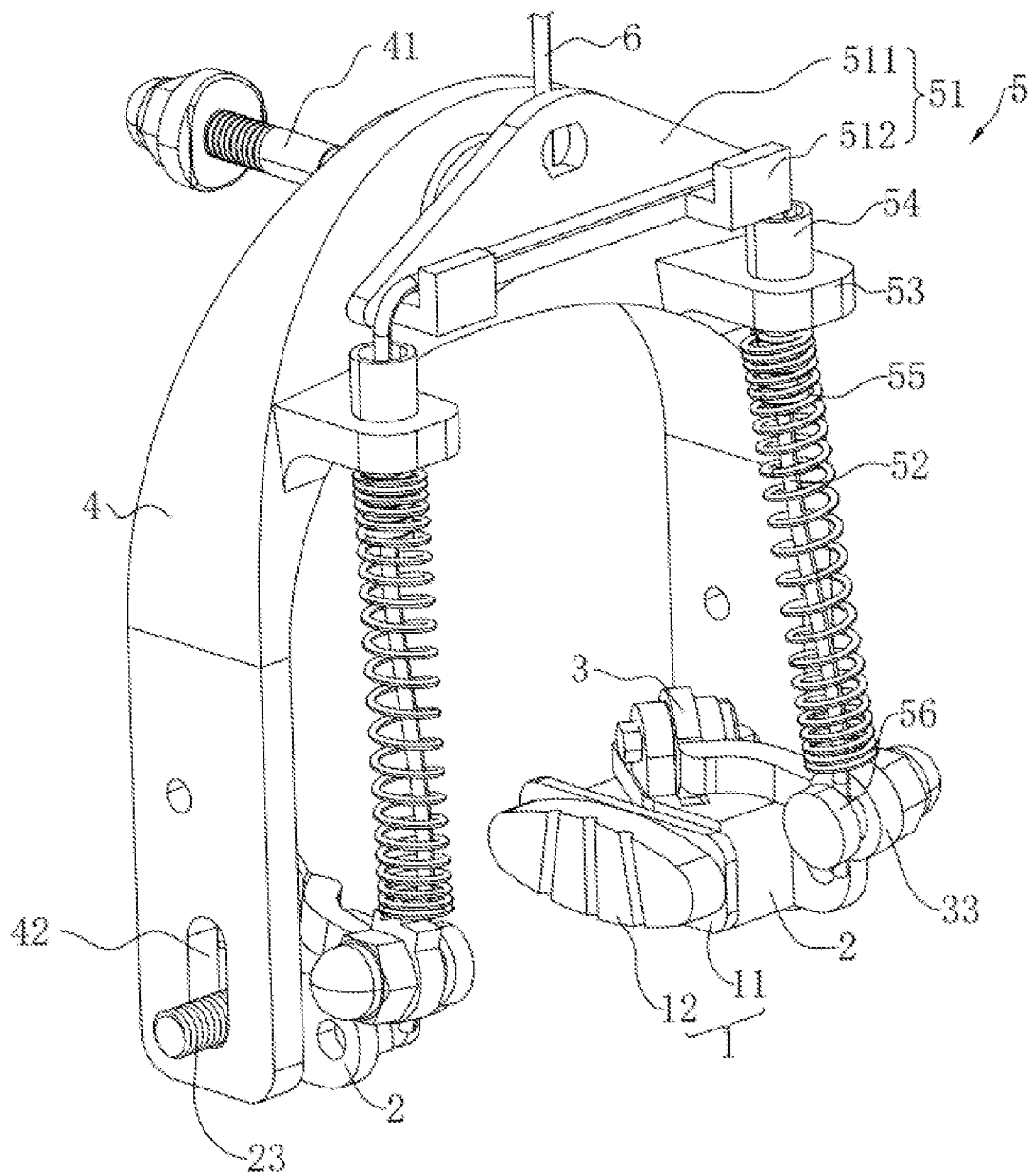
FIG. 1 is an overall schematic structural view of Embodiment 1.

The present application will be further described in detail below with reference to FIGS. 1 to 5.

An embodiment of the present application provides a synchronously driven brake.

Embodiment 1

A synchronously driven brake is provided, which is used for bicycle braking, and mainly suitable for a children bicycle. The synchronously driven brake generates assistance by braking to reduce an actuating force on a brake handle during braking, so as to adapt to situations where there is insufficient grip strength for children. The synchronously driven brake includes a retainer 4, guide bases 2, a braking portion 1 and a driving mechanism 3. The retainer 4 is a U-shaped frame fixed to a bicycle body. Two guide bases 2 are provided, and fixed to both ends of the retainer 4, respectively. Two braking portions 1 are slidably connected to the guide bases 2, respectively. The driving mechanism 3 guides and transmits an actuating force of the brake handle from a brake cable 6, and drives the braking portions 1 to slide along the guide bases 2, so that the braking portions 1 get in contact with and press against a bicycle wheel rim or are separated from the wheel rim.

Referring to FIG. 1, in order to install the retainer 4 on a bicycle body, a pressure rod 41 is provided penetrating through the retainer 4, wherein a pressure disc is fixedly provided at one end of the pressure rod 41, and the other end of the pressure rod 41 passes through the bicycle body and then in threaded connection with a nut. The nut, the bicycle body, the retainer 4 and the pressure disc are pressure connected with each other.

Figure 2:
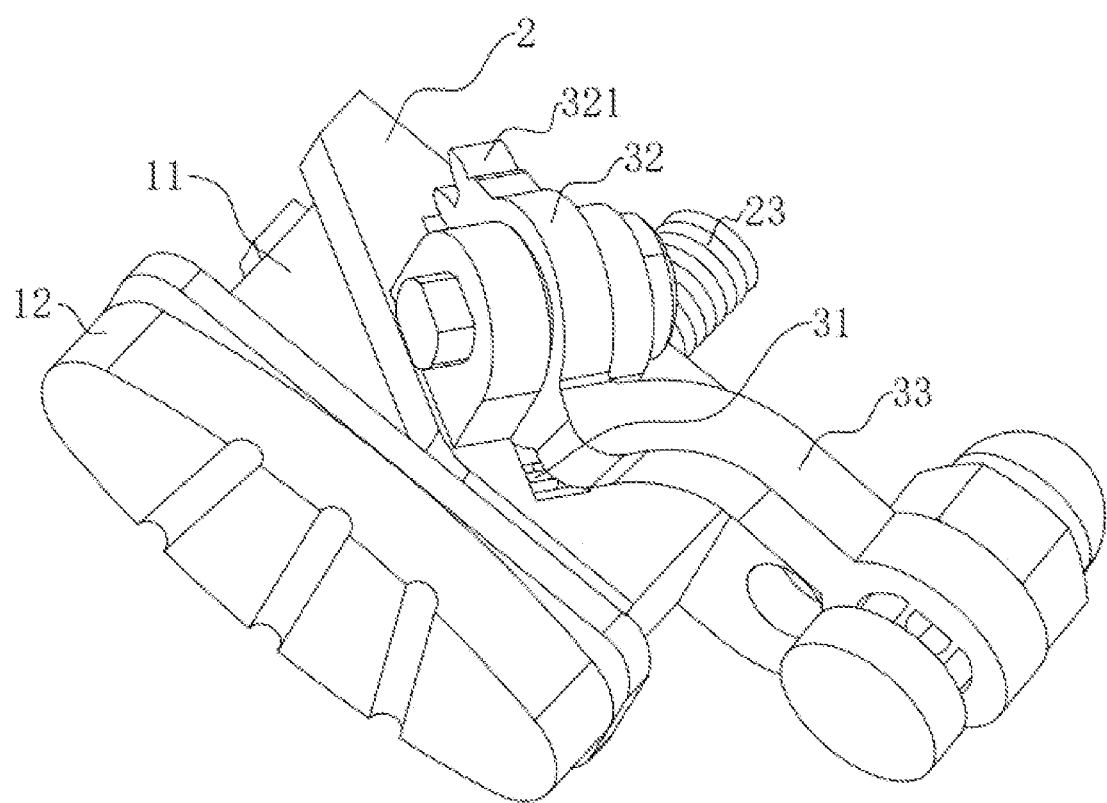
FIG. 2 is a schematic structural view of a driving mechanism in Embodiment 1.

Referring to FIG. 1 and FIG. 2, in order to fix the guide bases 2 on the retainer 4, a connecting rod 23 is integrally formed on each of the guide bases 2. The connecting rod 23 is a screw rod. A slot hole 42 is defined in each of two ends of the retainer 4. The connecting rod 23 is passed through the slot hole 42 in the retainer 42 to be in threaded connection with the nut, such that the retainer 4 is further fixed on the bicycle body while the guide bases 2 are fixed on the retainer 4. The slot holes 42 in the retainer 4 facilitate the adjustment of the positions of the guide bases 2 in a radial direction of wheels facilitating the installation of the connecting rods 23.

In another embodiment, the connecting rod 23 is passed through holes in the bicycle body and then in threaded connection with the nut, so that the nut, the bicycle body, the retainer 4 and the guide bases 2 are pressure connected with each other. In another embodiment, prior to pressing the braking portions 1 to be in contact with the wheel rim, the guide bases 2 are allowed to be movable. The guide bases 2 are slidably connected to the retainer 4. After being moved for a certain distance, the guide bases 2 are limited by the retainer 4 to get in contact with and press against the retainer 4.

Figure 3:
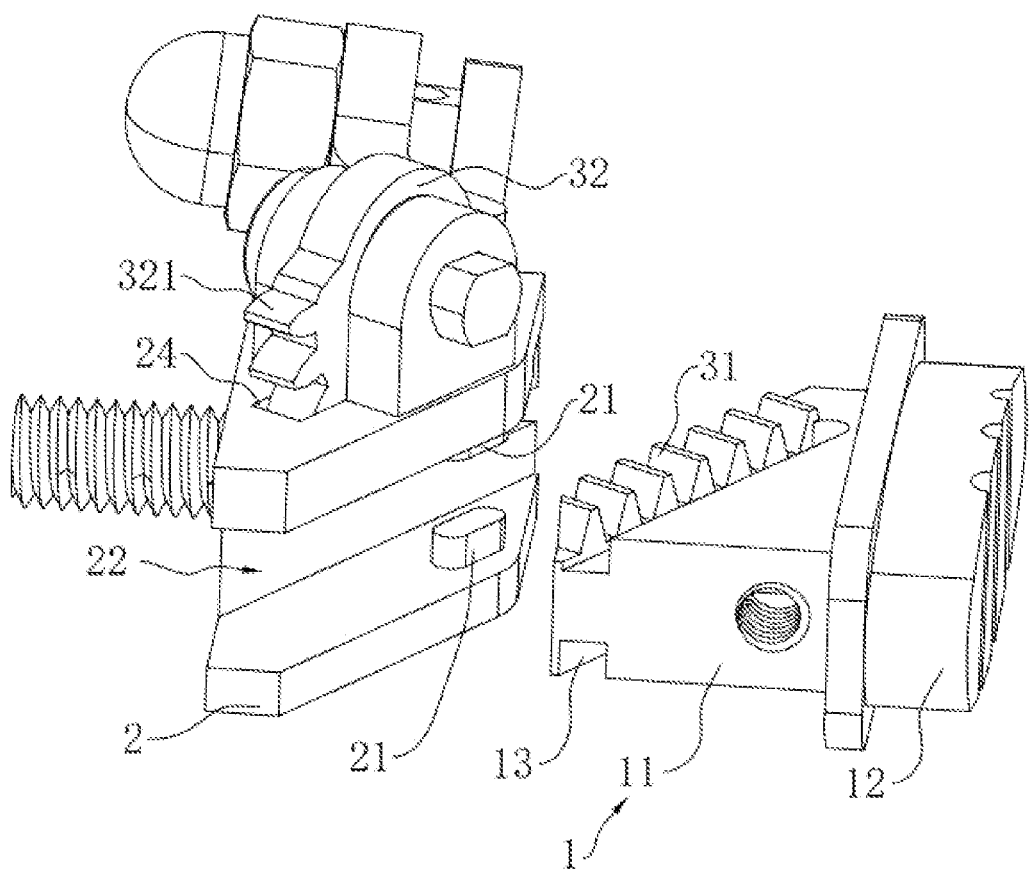
FIG. 3 is a schematic structural view of a guide base and braking portions in Embodiment 1.

Referring to FIG. 3, in order to connect the guide bases 2 with the braking portions 1, and limit a motion trajectory of the braking portions 1 while preventing the braking portions 1 from being disengaged from the guide base 2, a notch groove 22 is defined in one end of each guide base 2. When the bicycle is moved forward, the notch groove 22 is located at one end of the guide base 2 away from a rotation direction of the wheel rim. A bottom surface of the notch groove 22 is inclined relative to an axis direction of the wheel rim. The bottom surface of the notch groove 22 refers to a surface indicated by one end of an arrow 22 in FIG. 3. In this embodiment, an acute angle between the bottom surface of the notch groove 22 and the axis of the wheel rim is 57 degrees. The notch groove 22 penetrates through two sides of the guide base 2 along an axis direction of the wheel rim; and two guide blocks 21 are fixedly provided on the guide base 2, and respectively located on two side surfaces, which do not penetrate through the guide base 2, of the notch groove 22. A surface of the guide block 21 parallel to the bottom surface of the notch groove 22 is a flat surface. Two guide grooves 13 receiving the guide blocks 21 respectively are formed in each of the braking portions 1. When the braking portions 1 are placed into the notch grooves 22 and the guide blocks 21 is moved into the guide grooves 13, the braking portions 1 are connected with the guide bases 2, with a length direction of the guide groove 13 being parallel to the bottom surface of the notch groove 22. The braking portion 1 is configured to move in a direction inclined relative to the axis direction of the wheel rim due to the limitation by the bottom surface of the notch groove 22, two side surfaces of the notch groove 22 that do not penetrate through two side surfaces of the guide base 2, and the guide block 21. In addition, when the braking portions 1 is moved toward the wheel rim, the braking portions are moved toward a forward direction in the rotation of the wheel rim when the bicycle are moved forward. In this embodiment, the braking portions 1 is moved in a forward direction in a tangential direction of the wheel rim when the bicycle body is moved forward. In another embodiment, there is an included angle between a movement direction of the braking portions 1 and a forward direction in the tangential direction of the wheel rim when the bicycle body is moved forward.

In another embodiment, the guide base 2 is provided with a guide groove with a length direction in line with the movement direction of the braking portion 1, and a guide block located in the guide groove and sliding in a length direction of the guide groove is fixedly provided on each braking portion 1.

Referring to FIG. 3, each of the braking portions 1 includes a brake base 11 and a braking block 12. The brake base 11 is configured to be slidably connected to the guide base 2. After installation, an end surface of the brake base 11 away from the bottom surface of the notch groove 22 is radially parallel to the bicycle wheel rim. In addition, a flange is provided to be in contact with the side surface of the guide base 2. A side surface of the guide block 21 away from the brake base 11 is in contact with the wheel rim to brake the wheel by the braking portions 1.

Figure 4:
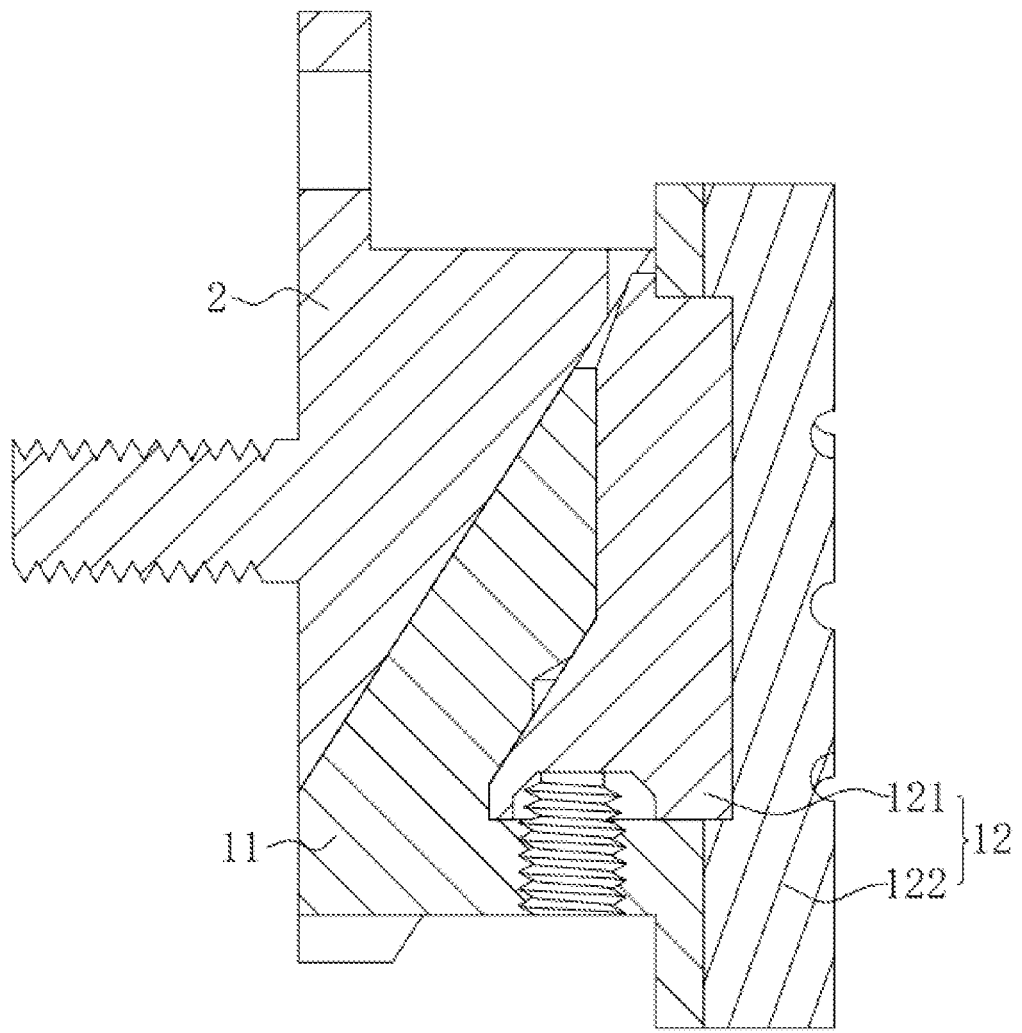
FIG. 4 is a schematic sectional view of the braking portion in Embodiment 1.

Referring to FIG. 4, in order to realize a removable connection between the braking block 12 and the brake base 11, a mounting groove is defined in the end surface of the brake base 11 away from the bottom surface of the notch groove 22. The braking block 12 includes a metal connection portion 121 and a friction portion 122, wherein the friction portion 122 in this embodiment is rubber. Part of the metal connection portion 121 is embedded in the friction portion 122. The metal connection portion 121 is placed into a forming mold of the friction portion 122 prior to forming the friction portion 122, such that the metal connection portion 121 is fixed with the friction portion 122 after the formation of the friction portion 122. The other portion of the metal connection portion 121 is located in the mounting groove of the brake base 11, and a threaded hole that communicates with the mounting groove is formed in the brake base 11. The metal connection portion 121 is placed into the mounting groove, and a bolt is mounted in the threaded hole in the brake base 11 to be in contact with and press against the metal connection portion 121, thereby achieving the connection between the braking block 12 with the brake base 11. In order to further improve the stability of the connection between the bolt and the metal connection portion 121, a connection groove that can receiving one end of the bolt is defined in the side surface of the metal connection portion 121.

In this embodiment, a surface of the braking portion 1 configured to be in contact with the wheel rim is radially parallel to the wheel rim, and an anti-skid groove is defined in the surface of the braking block 12 in contact with the wheel rim. In another embodiment, A surface of the braking portion 1 configured to be in contact with the wheel rim form an acute angle relative to the radial direction of the wheel rim.

In another embodiment, the braking portion 1 includes only a friction portion 122 made of polymer plastic, wherein the friction portion 122 is in contact with and presses against the wheel rim while being slidably connected with the guide base 2.

Referring to FIG. 2 and FIG. 3, the driving mechanism 3 for driving the braking portions 1 to move includes a rack 31, a pushing portion 32, and a pull rod 33. The rack 31 is fixed on the brake base 11, the rack 31 and the brake base 11 are integrally formed, and the length of the rack 31 is in line with a length direction of the guide groove 13. The pushing portion 32 is rotatably connected to the guide base 2. Half of the periphery of the pushing portion 32 is provided with a wheel gear 321 meshing with the rack 31, and the other half is a smooth curved surface. The pushing portion 32 meshes with the rack 31. A relief groove 24 which communicates with the notch groove 22 is defined in the guide base 2. The pushing portion 32 is passed through the relief groove 24 to mesh with the rack 31 located in the notch groove 22. A rotating shaft which is coaxial with the pushing portion 32 and bases that are sleeved on two ends of the rotating shaft are provided penetrating through the pushing portion 32. The bases are fixed on the guide bases 2. The pull rod 33 and the pushing portion 32 are integrally formed with each other. The pull rod 33 has a shape correspond to that of the bicycle body, so as to ensure that the pull rod 33 does not interfere with features on the bicycle body during a rotation around the axis. When the pull rod 33 is rotated to rotate the pushing portion 32, the rack 31 meshing with the pushing portion 32 is moved by the rotation of the pushing portion 32, so as to drive the braking portions 1 via the driving mechanism 3.

As an optional technical solution, in order to reduce a gap between two side surfaces, on which the guide blocks 21 are provided, of the notch groove 22, a rack groove that corresponds to the rack 31 is defined in the guide base 2. A portion of the rack 31 is located in the rack groove. Cooperation of the rack groove and the rack 31 facilitates improving the stability of the sliding connection between the guide bases 2 and the braking portions 1.

In another embodiment, the rack 31 is formed separately and then fixedly connected to the brake base 11. In another embodiment, the rack 31 is a structure in which a plurality of grooves that is provided at intervals in the length direction of the guide groove 13 and corresponds to the wheel gear on the rotating pushing portion 32 is formed on the brake base 11. The shapes of the pushing portion 32 and the wheel gear 321 are not limited, as long as the pushing portion 32 is in contact with and press against the rack 31 during rotation to push the braking portion 1. For example, the pushing portion 32 and the rack 31 can be configured as protrusions and matched grooves.

In another embodiment, the driving mechanism 3 drives the braking portions 1 to move and press against the surface of the wheel rim. After the braking portions 1 contact the surface of the wheel rim, the driving mechanism 3 stops exerting an actuating force on the braking portions 1. The braking portions 1 are driven by the wheel rim and limited by the guide bases 2 to press against a side surface of the wheel rim. The driving mechanism 3 translates and pulls the braking portions 1 to move. The driving mechanism 3 is a brake connecting line fixed on the brake base 11, and the brake connecting line is connected to the brake cable 6 on the bicycle body. After the brake connecting line drives the braking portions 1 to move and press against the wheel rim, the braking portions 1 enter a gap between the wheel rim and the guide base 2 under the driving of the wheel rim, and, without a need for the driving mechanism 3 to continue to apply the actuating force on the braking portions 1, the wheel rim can continuously drive the braking portions 1 to be wedged tightly between the wheel rim and the guide base 2, thereby achieving a braking effect on the wheel rim.

Referring to FIG. 1, a transmission mechanism 5 is connected to the driving mechanism 3. The transmission mechanism 5 is configured to transmit a force of the brake cable 6 of the bicycle body on the driving mechanism 3. The transmission mechanism 5 includes a balancing frame 51, a pull cable 52 and a restoring portion. The balancing frame 51 is fixedly connected with one end of the bicycle's brake cable 6 away from the brake handle. The pull cable 52 is connected to the balancing frame 51 and the pull rods 33 on the two driving mechanisms 3 on the same retainer 4. The pull cable 52 is slidably connected to the balancing frame 51. The balancing frame 51 is moved to drive the pull cables 52 to move, which applies a force on the two pull rods 33, such that the two pull rods 33 are rotated respectively around an axis of the rotating shaft of the pushing portion 32.

The balancing frame 51 includes an isosceles triangle plate 511 and two bent plates 512, in which a top end of the isosceles triangle plate 511 is fixedly connected with the pull cables 52. The isosceles triangle plate 511 is defined with a hole. The pull cables 52 are connected to the isosceles triangle plate 511 through a bolt and a nut. The two bent plates 512 are symmetrically fixed at two bottom ends of the isosceles triangle plate 512, and the pull cables 52 are placed on the two bent plates. The bent plates 512 are configured to connect the pull cables 52 with the balancing frame 51. In this embodiment, the pull cables 52 are in a tensioned state and are pressed against the bent plates 512, and the bent plates 512 stops the pull cables 52 in the tensioned state from being separated from the balancing frame 51, without hindering the sliding of the pull cables 52 relative to the bent plates 512.

In another embodiment, the pull cables 52 are directly fixed on the balancing frame 51. Two pull cables 52 are provided and respectively connected to the two pull rods 33. The shape of the balancing frame 51 is not limited and can be rectangular. However, a connection position of the balancing frame 51 with the brake cable 6 is located between connection positions of the balancing frame with the two pull cables 52. The balancing frame 51 is slidably connected with the retainer 4, without hindering the movement of the balancing frame 51, and the balancing frame 51 can be limited from being separated from the retainer 4. The balancing frame 51 is provided with a long round hole through which a bolt is provided penetrating to be in threaded connection with the retainer 4. The movement range of the balancing frame 51 is limited by a bolt and a nut.

Referring to FIG. 1, cable locking members 56 connected with the pull rods 33 are provided at two ends of the brake cable 6. The cable locking members 56 are cable locking bolts. A cable hole is formed in one end, close to the nut, of the side surface of each cable locking member 56. A round hole that has an axis along an axial direction of the wheel rim and allows the cable locking member 56 to pass through is formed in each pull rod 33. An end of the pull cable 52 is passed through the cable hole in the cable locking member 56, and then the cable locking member 56 is passed through the round hole in the pull rod 33 that matches the cable locking member 56. A nut is in threaded connection with the cable locking member 56. The nut, the pull rod 33, the pull cable 52, and the nut cap of the cable locking member 56 are in pressure connection with each other to realize a fixed connection of the pull cable 52 with the pull rod 33.

The restoring portion includes two cable holders 53 and two restoring springs 55, wherein the cable holders 53 are fixed on the retainer 4. Each of the cable holder 53 is provided with a hole configured for the pull cable 52 to pass through. Two ends of the pull cable 52 are passed through corresponding cable holders 53 and then fixedly connected with the two pull rods 33, respectively. The restoring springs 55 are sleeves outsides the two pull rods 33. The two restoring springs 55 are pressure springs, two ends of which are pressed against the cable holders 53 and the pull rods 33, respectively. When the balancing frame 51 is moves away from the cable holders 53, the balancing frame 51 drives the pull cables 52 to move, and two ends of the pull cable 52 drive the pull rod 33 to rotate, so that a gap is formed between the pull rod 33 and the surface of the guide base 2, while the restoring spring 55 is further compressed by the pull rod 33 and the cable holder 53. When the brake cable 6 does not apply a pull force on the balancing frame 51, the restoring spring 55 applies a pressure to the pull rods 33, driving the pull rods 33 to rotate around an axis of the pushing portions 32 until the pull rod 33 is in contact with and pressed against the surface of the guide base 2.

As an optional technical solution, the restoring portion further includes two wire pipes 54 which are sleeved outsides the pull cable 52 and correspond to the two cable holders 53 respectively.

In another embodiment, the restoring portion includes two torsion springs. A round hole configured for receiving each of two free ends of the two torsion springs is formed in ach of the two pull rods 33. Round holes configured for receiving each of the two free ends of the two torsion springs are formed in the retainer 4. A rotating shaft that is fixedly connected with the retainer 4 is provided on the torsion springs in a penetrating manner. A retaining ring is fixedly provided at one end of the rotating shaft to limit the torsion springs from be separated from the rotating shaft. when the pull rods 33 rotate to be separated from the guide base 2, the torsion springs are further compressed.

This embodiment is not limited to a children's bicycle, but can also be used for a brake in other low-speed vehicles, such as wheelchairs and conventional electric bicycles. The brake cable 6 in this embodiment is a flexible steel wire. In one other embodiment, the brake cable 6 is a rigid rod. In another embodiment, the brake cable 6 is a combination of a flexible steel wire and a rigid rod, as long as the brake cable 6 can transmit an actuating force from a human body to the driving mechanism 3.

A synchronously driven brake in this embodiment of the present application is implemented according to the following principle:

when the brake cable 6 is pulled, an actuating force is applied on the balancing frame 51, the balancing frame 51 is moved to drive the pull cables 52 to move. The pull cables 52 is moved to drive the pull rods 33 to move to rotate the pushing portions 32, and the pushing portions 32 are rotated to rotate the wheel gear 321. The wheel gear 321 is rotated to drive the rack 31 to move, so that the rack 31 drives the brake base 11 to move under the guiding of the guide bases 2 along a fixed trajectory. The brake bases 11 is moved to drive the braking blocks 12 to move into a space between the wheel rim and the guide bases 2, where, on one hand, the braking portions 1 are pressed by a pushing force from the driving mechanism 3 to press against the wheel rim, and on the other hand, are driven by the wheel rim to be wedged between the wheel rim and the guide bases 2, thereby achieving a braking of the braking portion on the wheel rim.

When the actuating force from the brake cable 6 is removed, the restoring portions drive the pull rods 33 to rotate reversely, so that the wheel gear 321 drives the rack 31 to move away from the wheel rim, realizing the separation of the braking blocks 12 from the wheel rim.

Embodiment 2

Figure 5:
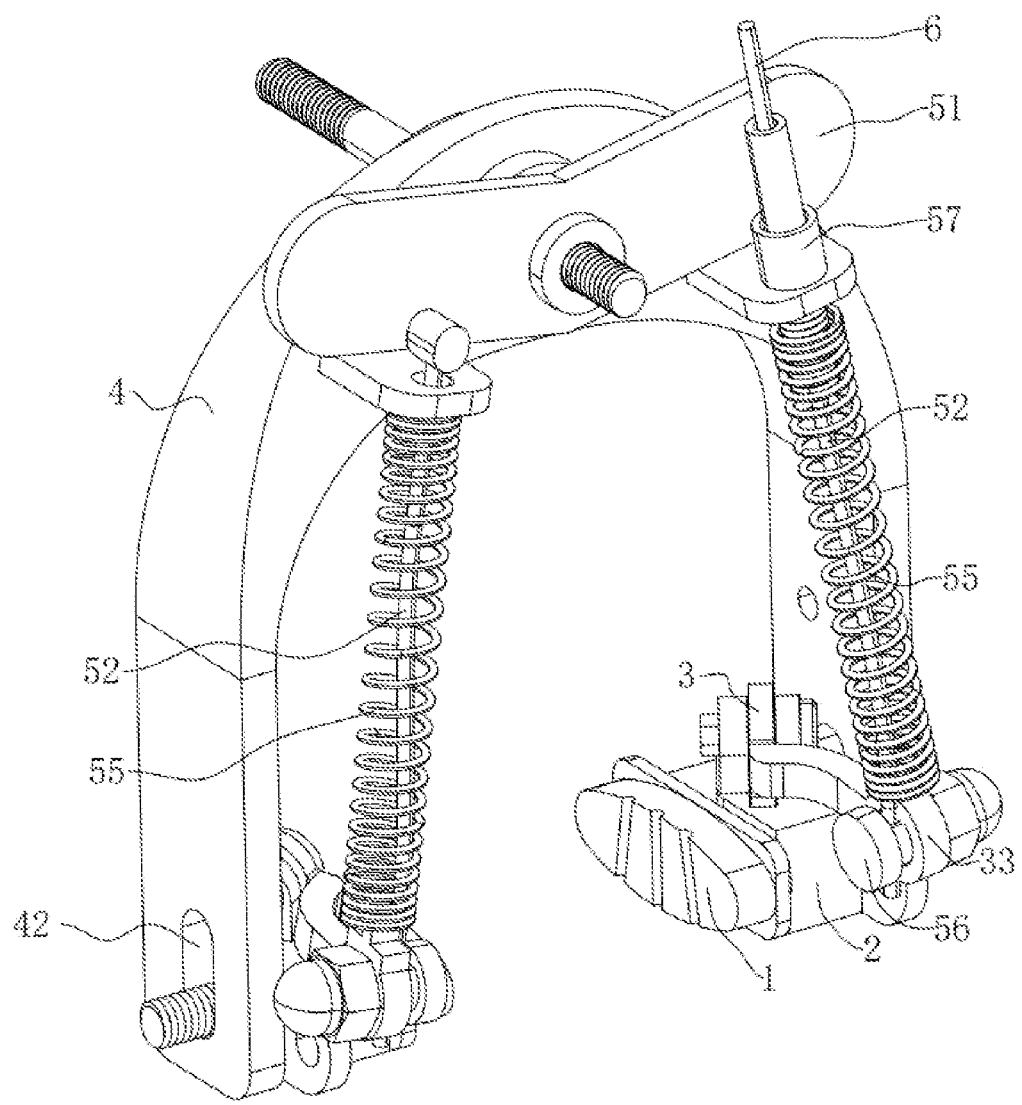
FIG. 5 is an overall schematic structural view of Embodiment 2.

Referring to FIG. 5, this embodiment differs from Embodiment 1 in that: the synchronously driven brake includes a transmission mechanism 5, wherein the transmission mechanism 5 includes two pull cables 52; the balancing frame 51 is rotatably connected with the bicycle body; a connecting rod is provided on the balancing frame 51 in a penetrating manner; the connecting rod passes through the retainer 4; the connecting rod is sleeved with retaining rings which are respectively located at two sides of the balancing frame 51; a nut is threadedly connection with the connecting rod to keep the retainer 4 in pressure with the bicycle body; and a nut is threadedly connected with the connecting rod to limit the movement of the balancing frame 51 along an axis direction of the connecting rod.

A rotation axis of the balancing frame 51 is located in the middle of two connecting positions of the balancing frame 51 with two pull cables 52 respectively; the pull cables 52 include a left pull cable and a right pull cable, in which the left pull cable is fixedly connected to the balancing frame 51, one end of the left pull cable passes through the balancing frame 51, and a baffle block pressing against the surface of the balancing frame 51 is fixedly provided at one end of the left pull cable that passes through the balancing frame 51; the right pull cable is fixedly connected with the bicycle's brake cable 6 and slidably connected with the balancing frame 51; the right pull cable is integrally provided with the brake cable 6; a sleeve 57 sleeved outside the brake cable 6 is fixedly connected to the balancing frame 51; one end of the sleeve 57 is fixed to the surface of the balancing frame 51, and the other end of the sleeve 57 presses against the brake handle connected with the brake. When the brake handle is pushed to drive the brake cable 6 to move, the sleeve 57 presses against a right side of the balancing frame 51, such that the right side of the balancing frame 51 is rotated toward the cable locking rod connected to the right pull cable, by which a left side of the balancing frame 51 drives the left pull cable to move, and the left pull cable drives the cable locking member connected to the left pull cable to move upward synchronously.

The above are the optimal embodiments of the present application and are not intended to limit the protection scope the present application. Therefore, any equivalent changes made in accordance with the structure, shape and principle of the present application shall fall within the protection scope of the present application.

LIST OF REFERENCE SIGNS

1 Braking portion
11 Brake base 12 braking block
121 Metal connection portion
122 Friction portion
13 Guide groove
2 Guide base
21 Guide block
22 Notch groove
23 Connecting rod
24 Relief groove
3 Driving mechanism
31 Rack
32 Pushing portion
321 Wheel gear
33 Pull rod
4 Retainer
41 Pressure rod
42 Slot hole
5 Driving mechanism
51 Balancing frame
511 Isosceles triangle plate
512 Bent plate
52 pull cable
53 Cable holder
54 Wire pipe
55 Restoring spring
56 Cable locking member
57 Sleeve
6 Brake cable

What is claimed is:

1. A synchronously driven brake, comprising a balancing frame configured to be connected with a brake cable and driven by the brake cable, wherein a pull cable is connected to the balancing frame and connected with a first cable locking member and a second cable locking member, and configured to apply a same force to the first cable locking member and the second cable locking member; and a first braking portion and a second braking portion driven by the first cable locking member and the second cable locking member to move and press against a wheel rim to decelerate the wheel rim are respectively connected to the first cable locking member and the second cable locking member; and the synchronously driven brake further comprises a first restoring portion and a second restoring portion applying to the first braking portion and the second braking portion a force enabling the first braking portion and the second braking portion to move away from the wheel rim, wherein the first restoring portion and the second restoring portion are in one-to-one correspondence to the first braking portion and the second braking portion, and each of the first restoring portion and the second restoring portion keep the pull cable and the balancing frame connected with the brake cable in a tensioned state, wherein each of the first restoring portion and the second restoring portion comprises a cable seat fixedly connected to a bicycle body, and a restoring spring located between the cable seat and each of the first cable locking member and the second cable locking member to apply a force in a direction away from the balancing frame, and wherein the restoring spring is a pressure spring sleeved outside the pull cable.

2. The synchronously driven brake according to claim 1, wherein the balancing frame is slidably connected with the pull cable, and two ends of the pull cable are connected with the first cable locking member and the second cable locking member, respectively.

3. The synchronously driven brake according to claim 1, wherein there are two of the pull cables; the balancing frame is rotatably connected to the bicycle body; a rotation axis of the balancing frame is located between connecting positions of the balancing frame with the two pull cables; a first pull cable of the two pull cables is fixedly connected with the balancing frame, and a second pull cable of the two pull cables is fixedly connected with the brake cable and slidably connected with the balancing frame; and a sleeve is sleeved outside the brake cable and fixedly connected to the balancing frame.

4. The synchronously driven brake according to claim 1, wherein a guide base is provided outside each of the first braking portion and the second braking portion and configured to guide each of the first braking portion and the second braking portion to slide in a linear direction.

5. The synchronously driven brake according to claim 4, wherein a sliding direction of each of the first braking portion and the second braking portion is oblique to an axial direction of the wheel rim; and each of the first braking portion and the second braking portion is moved toward a forward direction of the wheel rim when the bicycle body is moved forward.

6. The synchronously driven brake according to claim 5, wherein a pull rod fixedly connected to the guide base is fixedly connected to each of the first cable locking member and the second cable locking member; a wheel gear is fixedly provided on the pull rod; and a rack meshing with the wheel gear when each of the first braking portion and the second braking portion move is fixedly provided on each of the first braking portion and the second braking portion.

7. A synchronously driven brake, comprising a balancing frame configured to be connected with a brake cable and driven by the brake cable, wherein a pull cable is connected to the balancing frame and connected with a first cable locking member and a second cable locking member, and configured to apply a same force to the two cable locking the first cable locking member and the second cable locking member; a first braking portion and a second braking portion driven by the first cable locking member and the second cable locking member to move and press against a wheel rim to decelerate the wheel rim are respectively connected to the first cable locking member and the second cable locking member; and the synchronously driven brake further comprises a first restoring portion and a second restoring portion applying to the first braking portion and the second braking portion a force enabling the first braking portion and the second braking portion to move away from the wheel rim, wherein the first restoring portion and the second restoring portion are in one-to-one correspondence to the first braking portion and the second braking portion, and the first restoring portion and the second restoring portion keep the pull cable and the balancing frame connected with the brake cable in a tensioned state;

the first braking portion and the second braking portion are moved toward a tangential direction of the wheel rim when a bicycle body moves forward; and a sliding direction of each of the first braking portion and the second braking portion is oblique to an axial direction of the wheel rim, and each of the first braking portion and the second braking portion is moved toward a forward direction of the wheel rim when the bicycle body is moved forward; a pull rod that is fixedly connected to a guide base is fixedly connected to the first cable locking member and the second cable locking member; a wheel gear is fixedly provided on the pull rod; and a rack meshing with the wheel gear when each of the first braking portion and the second braking portion move is fixedly provided on each of the first braking portion and the second braking portion.

8. The synchronously driven brake according to claim 7, wherein each of the first restoring portion and the second restoring portion comprise a cable seat fixedly connected to the bicycle body, and a restoring spring located between the cable seat and each of the first cable locking member and the second cable locking member to apply a force in a direction away from the balancing frame.

9. The synchronously driven brake according to claim 8, wherein the restoring spring is a pressure spring sleeved outside the pull cable.

10. The synchronously driven brake according to claim 7, wherein each of the first restoring portion and the second restoring portion comprises a connecting shaft fixedly connected to the bicycle body and a torsion spring sleeved outside of the connecting shaft, a first end of the torsion spring is connected to a rotating part, and a second end of the torsion spring is fixedly connected to the bicycle body.

11. The synchronously driven brake according to claim 7, wherein the balancing frame is slidably connected with the pull cable, and two ends of the pull cable are connected with the first cable locking member and the second cable locking member respectively.

12. The synchronously driven brake according to claim 7, wherein there are two of the pull cables; the balancing frame is rotatably connected to a bicycle body; a rotation axis of the balancing frame is located between connecting positions of the balancing frame with the two pull cables; a first pull cable of the two pull cables is fixedly connected with the balancing frame, and a second pull cable of the two pull cables is fixedly connected with the brake cable and slidably connected with the balancing frame; and a sleeve is sleeved outside the brake cable and fixedly connected to the balancing frame.

13. The synchronously driven brake according to claim 7, wherein the guide base is provided outside each of the first braking portion and the second braking portion and configured to guide each of the first braking portion and the second braking portion.

14. A synchronously driven brake, comprising a balancing frame configured to be connected with a brake cable and driven by the brake cable, wherein a pull cable is connected to the balancing frame and connected with a first cable locking member and a second cable locking member, and configured to apply a same force to the first cable locking member and the second cable locking member; and a first braking portion and a second braking portion driven by the first cable locking member and the second cable locking member to move and press against a wheel rim to decelerate the wheel rim are respectively connected to the first cable locking member and the second cable locking member; and the synchronously driven brake further comprises a first restoring portion and a second restoring portion applying to the first braking portion and the second braking portion a force enabling the first braking portion and the second braking portion to move away from the wheel rim, wherein the first restoring portion and the second restoring portion are in one-to-one correspondence to the first braking portion and the second braking portion, and each of the first restoring portion and the second restoring portion keep the pull cable and the balancing frame connected with the brake cable in a tensioned state, wherein a guide base is provided outside each of the first braking portion and the second braking portion and configured to guide each of the first braking portion and the second braking portion to slide in a linear direction, wherein a sliding direction of each of the first braking portion and the second braking portion is oblique to an axial direction of the wheel rim; and each of the first braking portion and the second braking portion is moved toward a forward direction of the wheel rim when a bicycle body is moved forward, and wherein a pull rod fixedly connected to the guide base is fixedly connected to each of the first cable locking member and the second cable locking member; a wheel gear is fixedly provided on the pull rod; and a rack meshing with the wheel gear when each of the first braking portion and the second braking portion move is fixedly provided on each of the first braking portion and the second braking portion.

* * * * *